O. F. HEER.
DRILL.
APPLICATION FILED MAR. 30, 1920.

1,407,348. Patented Feb. 21, 1922.

INVENTOR
Otto F. Heer
BY Hazard & Miller
ATT'YS.

UNITED STATES PATENT OFFICE.

OTTO F. HEER, OF ONTARIO, CALIFORNIA, ASSIGNOR OF ONE-HALF TO FRANK VAN PELT, OF ONTARIO, CALIFORNIA.

DRILL.

1,407,348.  Specification of Letters Patent.  Patented Feb. 21, 1922.

Application filed March 30, 1920. Serial No. 369,905.

*To all whom it may concern:*

Be it known that I, OTTO F. HEER, a citizen of the United States, residing at Ontario, in the county of San Bernardino and State of California, have invented new and useful Improvements in Drills, of which the following is a specification.

My invention is a portable drill and it consists of the novel features hereinafter described in this specification and illustrated in the annexed drawing which forms a part of this specification.

Referring to the drawing.

Figure 1:
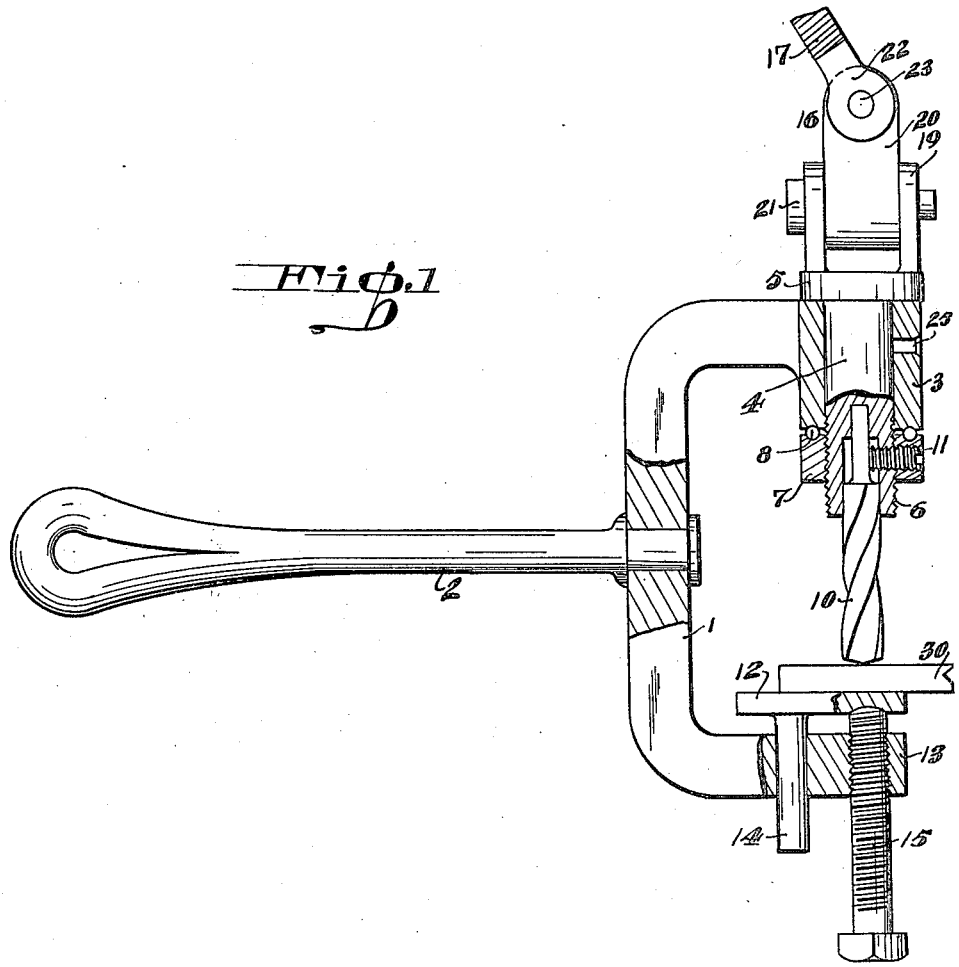
Figure 1 is a side elevation partly in section of my drill.
Figure 2:
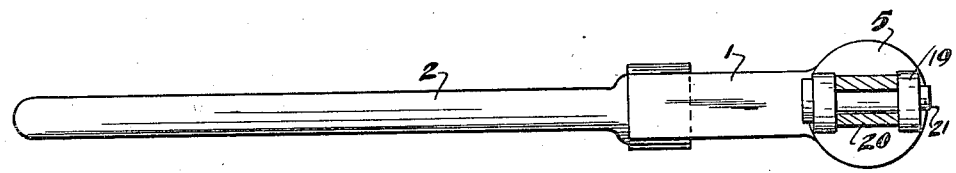
Figure 2 is a plan view of my drill.

In the drawing, 1 indicates a U-shaped frame in the cross member of which is riveted a handle 2. On one arm of the frame 1 is a bearing 3 in which is journaled a chuck 4. On the outer end of the chuck 4 is a head 5 which engages the outer end of the bearing 3. The inner end of the chuck 4 is provided with an external thread 6 on which screws a nut 7. Balls 8 are interposed between the inner end of the bearing 3 and the nut 7, the adjacent surface of said bearing and said nut being grooved to receive and hold said balls, thus providing an end thrust bearing for the drill bit 10 which is held in the chuck 4 by means of a set screw 11 which extends through the nut 7 and the chuck 6 in threaded engagement therewith and engages the shank of the bit, said set screw also locking the nut 7 in its proper position on the chuck 6.

A jaw 12 is arranged inside of the other arm 13 of the U-shaped frame 1 beyond the cutting end of the bit 10 and extends transversely of the axis of the said bit, said jaw having a shank 14 which extends outwardly through said arm 13 and is mounted to reciprocate in said arm. A bolt 15 extends through the arm 13 in threaded engagement therewith and bears at its end against the jaw 12 by means of which bolt the jaw 12 may be forced toward the end of the bit 10 or moved away from the bit when the bolt is screwed outwardly with relation to the arm 13. A universal joint 16 connects the outer end of the chuck 4 to a flexible power driven shaft 17.

Said universal joint includes a pair of ears 19 outstanding from the head 5, a link 20 pivoted at one end by pivot 21 between said ears and in eye 22 on the end of the flexible shaft 17 pivoted by pivot 23 to the other end of the link 20 at right angles to the pivot 21.

The oil hole 25 is provided in the bearing 3 for oiling the bearing and the chuck 4 so that the chuck 4 will turn freely and smoothly in the bearing. The work 30 is introduced between the cutting end of the bit 10 and the jaw 12 and the screw 15 is turned until the jaw 12 has moved inwardly far enough to grip the work against the end of the bit.

The operator holds the drill by the handle 2 and the bit 10 is rotated by power through the medium of the flexible shaft 17, universal joint 16 and chuck 4. At first as the bit drills the work, the screw 15 is turned sufficiently to force the work against the bit until a hole is drilled by the bit through the work. The screw 15 is then turned backwardly and the jaw 12 moved away from the bit until the work is withdrawn from the bit.

Various changes may be made without departing from the spirit of my invention as claimed.

I claim:

1. A drill comprising a frame, a bit journaled therein, a jaw arranged for free sliding movement in the frame for holding work to the bit, and a bolt threaded through said frame and abutting against the under side of said jaw to cause the latter to press the work against the bit.

2. A drill comprising a frame, a bit journaled therein, a jaw having a shank arranged for free sliding movement in the frame, said jaw supporting the work against the bit, and a bolt threaded through said frame and abutting against the under side of said jaw to cause the latter to press the work against the bit.

In testimony whereof I have signed my name to this specification.

OTTO F. HEER.